(12) United States Patent
Kim (10) Patent No.: US 9,847,557 B2
(45) Date of Patent: Dec. 19, 2017

(54) BATTERY PACK

(71) Applicant: SAMSUNG SDI CO., LTD., Yongin-si, Gyeonggi-do (KR)

(72) Inventor: Hyungshin Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 39 days.

(21) Appl. No.: 15/144,504

(22) Filed: May 2, 2016

(65) Prior Publication Data

US 2016/0329611 A1 Nov. 10, 2016

(30) Foreign Application Priority Data

May 6, 2015 (KR) ........................ 10-2015-0063217

(51) Int. Cl.
| | |
|---|---|
| *H01M 10/052* | (2010.01) |
| *H01M 10/42* | (2006.01) |
| *H01M 2/04* | (2006.01) |
| *H01M 10/04* | (2006.01) |
| *H01M 2/02* | (2006.01) |
| *H01M 2/06* | (2006.01) |
| *H01M 2/20* | (2006.01) |

(52) U.S. Cl.
CPC ..... *H01M 10/4257* (2013.01); *H01M 2/0202* (2013.01); *H01M 2/04* (2013.01); *H01M 2/06* (2013.01); *H01M 10/0436* (2013.01); *H01M 10/425* (2013.01); *H01M 2/20* (2013.01); *H01M 2200/00* (2013.01); *H01M 2200/106* (2013.01); *H01M 2220/30* (2013.01)

(58) Field of Classification Search
CPC ......................... H01M 10/425; H01M 10/052
See application file for complete search history.

(56) References Cited

U.S. PATENT DOCUMENTS

| | | |
|---|---|---|
| 2008/0160398 A1 | 7/2008 | Kim |
| 2011/0003196 A1 | 1/2011 | Kim |

(Continued)

FOREIGN PATENT DOCUMENTS

| | | |
|---|---|---|
| EP | 2328200 A1 | 6/2011 |
| JP | 2011-3510 A | 1/2011 |

(Continued)

OTHER PUBLICATIONS

Japanese Patent Abstract and Machine English Translation of Japanese Patent Publication No. 2011-3510 A, dated Jan. 6, 2011, 50 Pages.

(Continued)

*Primary Examiner* — Stewart Fraser
*Assistant Examiner* — Olatunji Godo
(74) *Attorney, Agent, or Firm* — Lewis Roca Rothgerber Christie LLP (57) ABSTRACT

A battery pack includes: a bare cell including an electrode terminal on a first surface thereof; a holder at the first surface and including a fixing groove at an upper surface thereof; a protection circuit module at the fixing groove and electrically connected to the bare cell; and a protection member attached to the protection circuit module. The protection member is attached to an upper surface of the protection circuit module, and the upper surface is at a lower height than upper edges of the fixing groove. An upper surface of the protection member is at a height that is the same as or lower than a height of edges of the holder.

10 Claims, 4 Drawing Sheets

(56) References Cited

U.S. PATENT DOCUMENTS

2013/0108900 A1   5/2013  Lee et al.
2014/0356687 A1  12/2014  Heo et al.

FOREIGN PATENT DOCUMENTS

| KR | 2002-0086228 A   | 11/2002 |
| KR | 10-0839783 B1    | 6/2008  |
| KR | 10-2013-0048683 A | 5/2013 |
| KR | 10-2014-0139862 A | 12/2014 |

OTHER PUBLICATIONS

Extended European Search Report dated Sep. 8, 2016 of the corresponding European Patent Application No. 16168475.8, (8 pages).

BATTERY PACK

CROSS-REFERENCE TO RELATED APPLICATION

This application claims priority to and the benefit of Korean Patent Application No. 10-2015-0063217, filed on May 6, 2015, in the Korean Intellectual Property Office, the disclosure of which is incorporated herein in its entirety by reference.

BACKGROUND

1. Field

One or more exemplary embodiments of the present invention relate to a battery pack.

2. Description of the Related Art

Unlike primary batteries that are not designed to be recharged, secondary batteries can be repeatedly charged and discharged. Thus, secondary batteries are used in various technical fields. Also, with the technical developments of and increased demand for mobile devices, the demand for secondary batteries for use as power sources for such devices has sharply increased.

SUMMARY

One or more exemplary embodiments of the present invention include a battery pack.

Additional aspects are set forth in part in the description which follows and, in part, will be apparent from the description, or may be learned by practice of the presented exemplary embodiments.

According to one or more exemplary embodiments, a battery pack includes: a bare cell including an electrode terminal on a first surface thereof; a holder at the first surface and including a fixing groove at an upper surface thereof; a protection circuit module at the fixing groove and electrically connected to the bare cell; and a protection member attached to the protection circuit module. The protection member is attached to an upper surface of the protection circuit module, and the upper surface is at a lower height than upper edges of the fixing groove. An upper surface of the protection member is at a height that is the same as or lower than a height of edges of the holder.

The edges of the holder may surround the protection circuit module and the protection member in a plane.

The protection member may include a tape having a thickness from about 0.1 mm to about 0.2 mm.

The protection circuit module may include a connector configured to be connected to an external device and a flexible circuit board (FCB) configured to be electrically connected to the connector.

The protection circuit module may include a step difference part, and the FCB may be configured to be extracted to the outside through the step difference part.

The battery pack may further include an insulating plate on a second surface of the bare cell, and the second surface of the bare cell may be opposite to the first surface of the bare cell. The insulating plate may include a protrusion protruding toward the outside.

A thickness of the insulating plate may range from about 0.15 mm to about 0.3 mm.

The holder may be attached to the first surface of the bare cell by a first adhesive layer. The insulating plate may be attached to the second surface of the bare cell by a second adhesive layer and the first adhesive layer may have an opening that exposes the electrode terminal.

The battery pack may further include a temperature protection device between the electrode terminal and the protection circuit module.

The bare cell may include: a can having an opening in a side thereof; an electrode assembly housed in the can; and a cap plate sealing the surface of the can, the electrode terminal being at the cap plate. The electrode terminal and the cap plate may have different polarities, and the protection circuit module may be electrically connected to the electrode terminal and the cap plate.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

As the inventive concept allows for various changes and numerous embodiments, particular exemplary embodiments are illustrated in the drawings and described in the specification. The attached drawings which illustrate exemplary embodiments of the inventive concept are referred to in order to gain a sufficient understanding of the inventive concept and aspects of the inventive concept. The inventive concept may, however, be embodied in many different forms and should not be construed as being limited to the exemplary embodiments set forth herein.

The inventive concept is now described more fully with reference to the accompanying drawings, in which exemplary embodiments of the inventive concept are shown. Like reference numerals in the drawings denote like elements, and thus their description may be omitted.

It will be understood that although the terms "first", "second", etc. may be used herein to describe various components, these components should not be limited by these terms. These components are only used to distinguish one component from another.

As used herein, the singular forms "a," "an" and "the" are intended to include the plural forms as well, unless the context clearly indicates otherwise. As used herein, the term "and/or" includes any and all combinations of one or more of the associated listed items. Expressions such as "at least one of," when preceding a list of elements, modify the entire list of elements and do not modify the individual elements of the list.

It will be further understood that the terms "comprises," "comprising," "includes" and/or "including" used herein specify the presence of stated features or components, but do not preclude the presence or addition of one or more other features or components.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that when a layer, element, region, or component is referred to as being "on," "connected to," or "coupled to" another layer, element, region, or component, it can be directly or indirectly on, connected to, or coupled to the other layer, region, or component. That is, for example, intervening layers, elements, regions, or components may be present. In addition, it will also be understood that when an element or layer is referred to as being "between" two elements or layers, it can be the only element or layer between the two elements or layers, or one or more intervening elements or layers may also be present.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

Sizes of components in the drawings may be exaggerated for convenience of explanation. In other words, because sizes and thicknesses of components in the drawings are arbitrarily illustrated for convenience of explanation, the following embodiments are not limited thereto.

The electronic or electric devices and/or any other relevant devices or components according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 1:
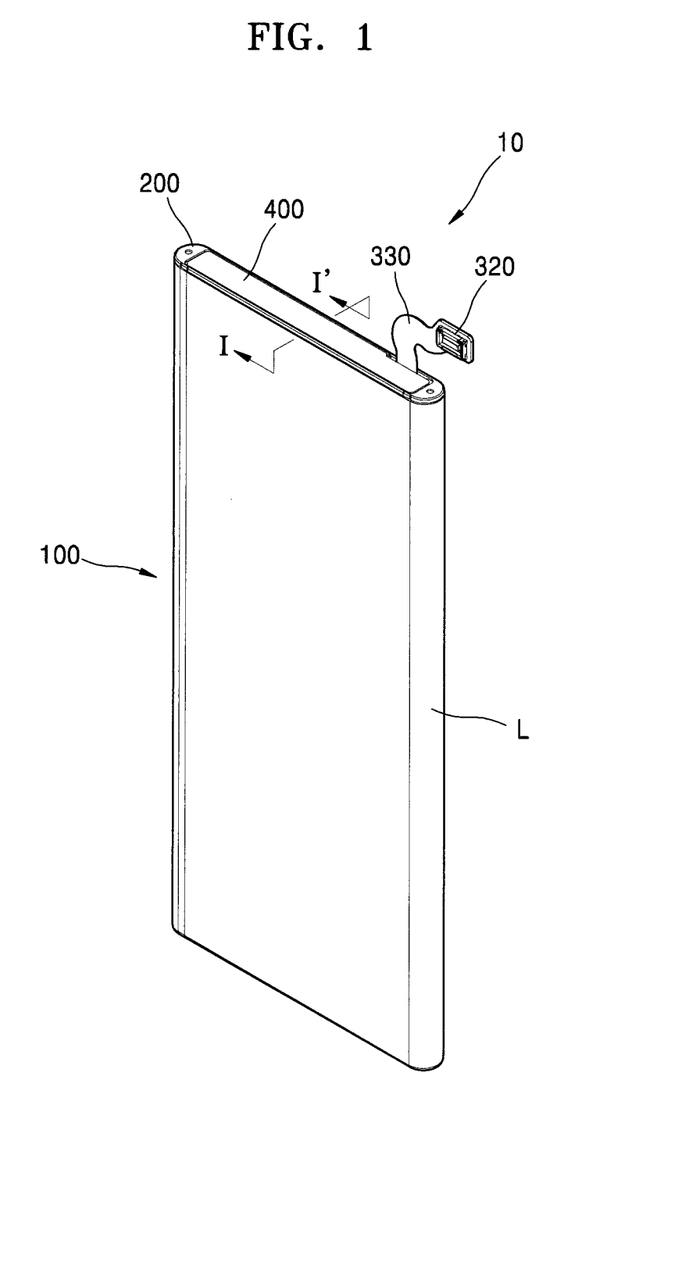
FIG. 1 is a schematic perspective view of a battery pack according to one or more exemplary embodiments of the present invention.
Figure 2:
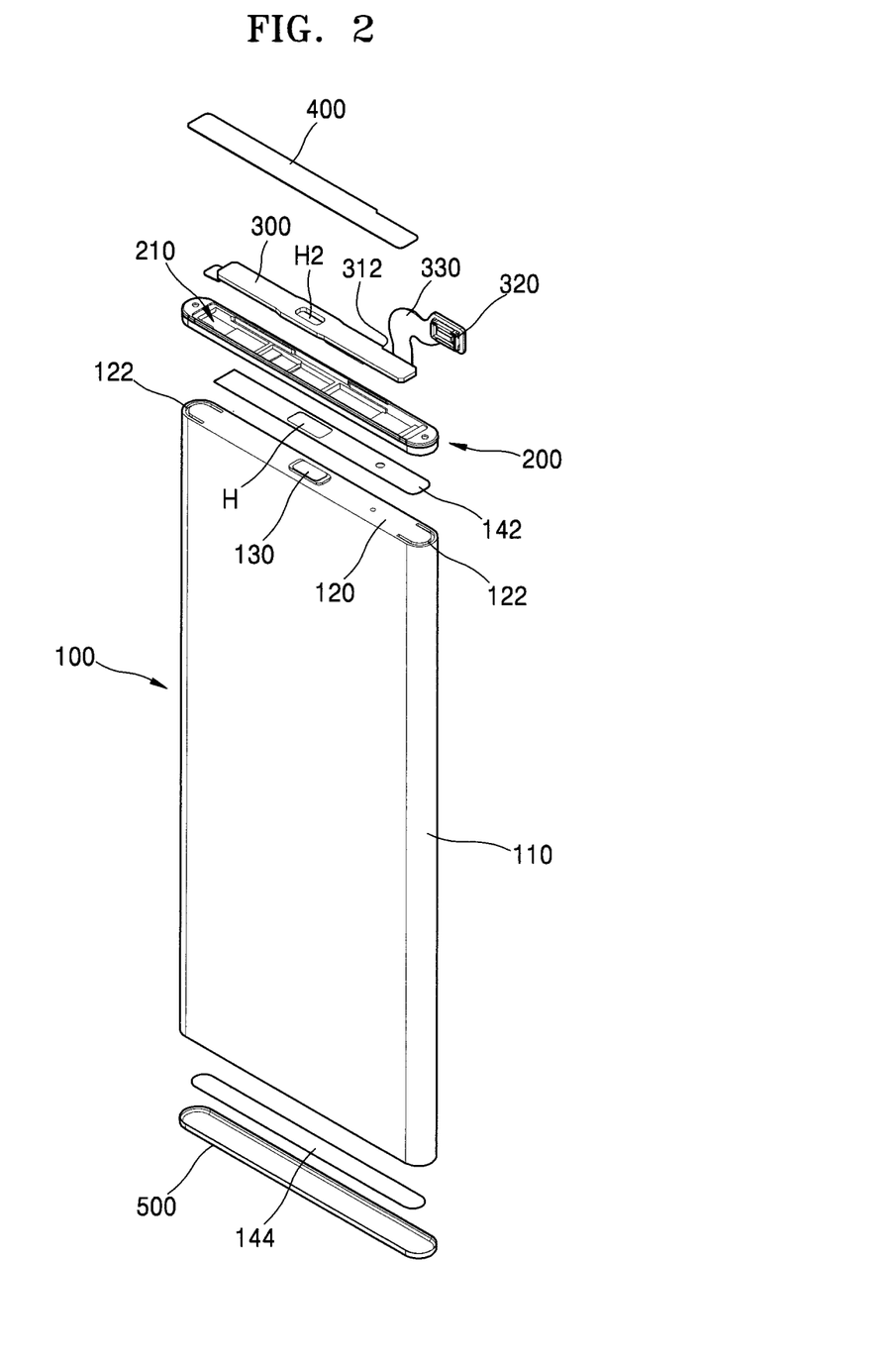
FIG. 2 is a schematic exploded perspective view of the battery pack of FIG. 1.
Figure 3:
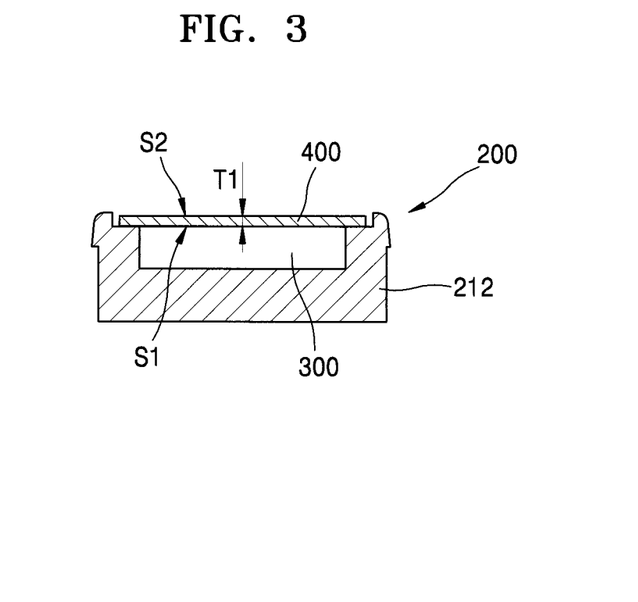
FIG. 3 is a schematic cross-sectional view taken along the line I-I' of FIG. 1.
Figure 4:
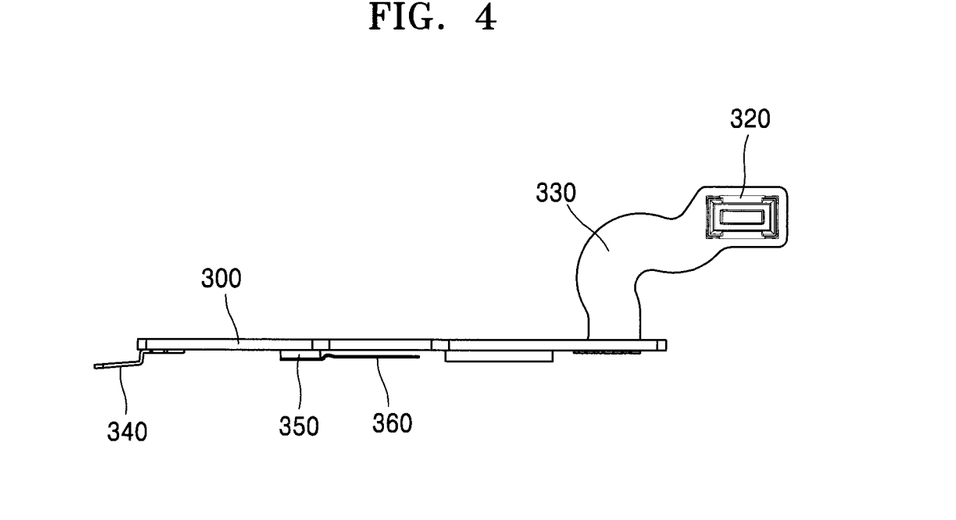
FIG. 4 is a schematic side view of a protection circuit module of FIG. 2.
Figure 5:
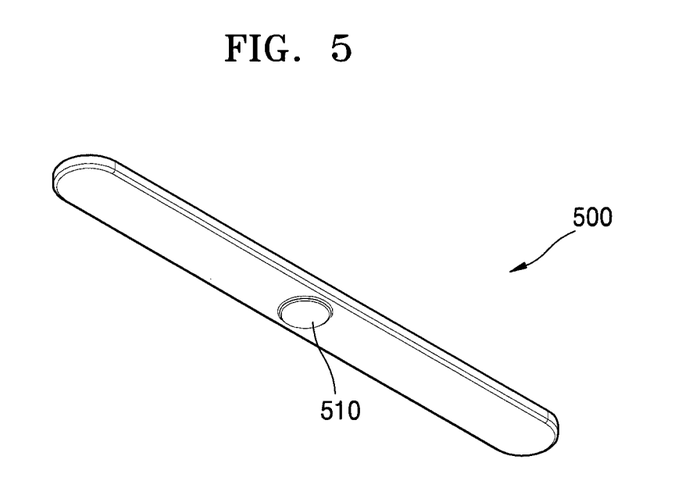
FIG. 5 is a schematic perspective view of an insulating plate of FIG. 2.

FIG. 1 is a schematic perspective view of a battery pack 10 according to one or more exemplary embodiments of the present invention, FIG. 2 is a schematic exploded perspective view of the battery pack 10 of FIG. 1, and FIG. 3 is a schematic cross-sectional view taken along the line I-I' of FIG. 1. FIG. 4 is a schematic side view of a protection circuit module of FIG. 2, and FIG. 5 is a schematic perspective view of an insulating plate of FIG. 2.

Referring to FIGS. 1 to 5, the battery pack 10 may include a bare cell 100 which includes an electrode terminal 130 on a first surface thereof (e.g., an upper surface of the bare cell 100), a holder 200 disposed at or on the first surface and including a fixing groove 210 formed therein, a protection circuit module 300 fixed in or at the fixing groove 210 and electrically connected to the bare cell 100, and a protection member 400 attached to the protection circuit module 300. Also, the battery pack 10 may further include an insulating plate 500 disposed on a second surface opposite to the first surface (e.g., a lower surface of the bare cell 100) and a label L.

The bare cell 100 may include a can 110 having an opening in a side thereof (e.g., an upper side of the can 110), an electrode assembly accommodated in the can 110, and a cap plate 120 coupled to the can 110 and sealing the can 110.

The can 110 has a space therein, and the electrode assembly, which is impregnated with an electrolyte, may be arranged (or accommodated) in the can 110. The can may include a conductive material such as aluminum (Al), may protect (or substantially protect) the electrode assembly from an external impact, and may function as a heat sink for discharging heat, which may be generated while the electrode assembly is recharged or discharged, to the outside.

The electrode assembly may include a negative plate and a positive plate, each coated with a respective electrode active material, and a separator therebetween. For example, the electrode assembly may be in a jelly-roll form and may be formed by rolling a stack structure in which positive plates and negative plates are alternately stacked with the separator interposed therebetween. As another example, the electrode assembly may have a structure in which a negative plate, a separator, a positive plate, and a separator are repeatedly stacked.

The cap plate 120 and the can 110 may be formed of the same material. After the electrode assembly is placed in the can 110, the opening formed in the side of the can 110 may be closed by the cap plate 120. Boundaries between the cap plate 120 and the can 110 may be welded together using a laser for sealing the inside of the can 110. The electrode terminal 130 may be disposed on the cap plate 120. That is, the cap plate 120 may form the first surface of the bare cell 100. The electrode terminal 130 and the cap plate 120 each are electrically connected to the electrode assembly and may have different polarities. Therefore, a gasket formed of an insulating material may be disposed between the electrode terminal 130 and the cap plate 120 in order to prevent a short circuit between the electrode terminal 130 and the cap plate 120.

The cap plate 120 may include a groove 122 formed in at least one end portion thereof. The groove 122 may be formed in a lengthwise direction of the cap plate 120 to have a corresponding (or similar) shape relative to a side portion of the can 110.

The groove 122 may be formed in a thickness direction of the cap plate 120 (or in a downward direction or a height direction of the battery cell 100) from a surface of the cap plate 120 (e.g., an upper surface of the cap plate 120) such that the groove 122 may have a corresponding (or similar) shape as a side portion of the can 110. The groove 122 is spaced apart from the corresponding edge of the cap plate 120 and may surround a first lead plate 340 that is welded to at least the upper surface of the cap plate 120.

The groove 122 provides a space to accommodate (or gather) one or more beads (e.g., welding beads) that are generated when the cap plate 120 and the can 110 are welded together. As the generated beads may be scattered, the scattered beads may be attached onto the upper surface of the cap plate 120, and thus uneven portions may be formed on the cap plate 120.

When the uneven portions are formed on the upper surface of the cap plate 120, the holder 200, etc. may not be stably (or substantially stably) located on the cap plate 120. In particular, when the uneven portions are formed at a location where the first lead plate 340 is welded, the first lead plate 340 and the cap plate 120 may not be easily bonded, and the contact resistance between the first lead plate 340 and the cap plate 120 may increase.

Therefore, the groove 122 that is formed in at least one end portion of the cap plate 120 may prevent the uneven portions from being formed by the beads generated when the cap plate 120 and the can 110 are welded, and thus, the holder 200, etc. may be stably located on the cap plate 120, thereby improving the bonding between the first lead plate 340 and the cap plate 120.

In one or more embodiments, the holder 200 may be disposed on the first surface of the bare cell 100 (e.g., on the cap plate 120). For example, the holder 200 may be attached to the first surface by a first adhesive layer 142. A first opening (or first hole) H for exposing the electrode terminal 130 may be formed in the first adhesive layer 142.

The holder 200 may include an insulating material. A fixing groove 210 may be formed in the holder 200, and the protection circuit module 300 may be placed in or at the fixing groove 210, and openings (or holes) may be formed in the holder 200 at locations corresponding to the electrode terminal 130 and the first lead plate 340. Also, supporters for supporting a lower surface of the protection circuit module 300 may be formed on an inner surface of the holder 200 and may protrude inwardly.

The protection circuit module 300 is electrically connected to the bare cell 100 and may prevent the bare cell 100 from overcharging, over-discharging, overheating, or exploding due to an excess current passing therethrough. The protection circuit module 300 may include a safety device including a passive element, such as a resistor and/or a condenser (e.g., a capacitor), or an active element, such as a field-effect transistor. Alternatively, the protection circuit module 300 may include a protection device including integrated circuits selectively formed therein.

The protection circuit module 300 may be electrically connected to the cap plate 120 and the electrode terminal 130. In detail, the protection circuit module 300 may be electrically connected to the cap plate 120 by the first lead plate 340 and to the electrode terminal 130 by a second lead plate 360.

For example, the first lead plate 340 may be bonded to the cap plate 120 by welding, etc., and to this end, a portion of the first lead plate 340 may be bent. A first voltage of the cap plate 120 may be applied to the protection circuit module 300 via the first lead plate 340. For example, the first voltage may be a positive voltage.

The second lead plate 360 is bonded to the electrode terminal 130 by welding, etc., and receives a second voltage from the electrode terminal 130. A second opening (or second hole) H2 for passing a welding rod therethrough may be formed in the protection circuit module 300, and the welding rod may be used to weld the second lead plate 360 with the electrode terminal 130.

In one or more embodiments, the second voltage may be a negative voltage, and a temperature protection device 350 may be disposed between the electrode terminal 130 and the protection circuit module 300. For example, the temperature protection device 350 disposed between the protection circuit module 300 and the second lead plate 360 may prevent the bare cell 100 from igniting or being exploded due to an excess current.

The temperature protection device 350 is a reversible device that reverses a current flow and an insulation property according to a temperature and may be, for example, a polymer PTC including conductive particles such as metal particles or carbon particles scattered over a polymer, but the present invention is not limited thereto.

The protection circuit module 300 may include a connector 320 for connection to an external terminal and a flexible circuit substrate (FCB) 330 for electrical connection to the connector 320. Electronic components mounted on the protection circuit module 300, that is, the first lead plate 340, the second lead plate 360, and the FCB 330 may each be disposed on a surface of the protection circuit module 300 which faces the bare cell 100 (e.g., on a lower surface of the protection circuit module 300). Therefore, an upper surface S1 of the protection circuit module 300 which faces the outside may be flat or substantially flat, and the protection member 400 may be attached to the upper surface S1.

As described above, the protection circuit module 300 is fixed into the fixing groove 210, and edges 212 of the holder 200 which form the fixing groove 210 may be formed to entirely surround the protection circuit module 300 and the protection member 400 (e.g., may be formed to surround or entirely surround the protection circuit module 300 and the protection member 400 in a plane). In more detail, a step (e.g., a step difference) may be formed in the holder 200 such that widths of the edges 212 increase toward an upper portion of the holder 200, and the protection member 400 has a greater width than the protection circuit module 300 and may contact a step difference part (e.g., a step portion) that is formed by the upper surface S1 of the protection circuit module 300 and the edges 212 of the holder 200.

The upper surface S1 of the protection circuit module 300 may be disposed at a lower height (or level) than the edges 212 (e.g., than upper portions of the edges 212) of the holder 200 forming the fixing groove 210. Also, an upper surface S2 of the protection member 400 may be disposed at a height (or level) that is the same (or substantially the same) as or lower than a height of the edges 212 of the holder 200. That is, the protection member 400 covering the protection circuit module 300 does not protrude to the outside of the holder 200, and thus, a distance between the first surface of the bare cell 100 and an upper end portion of the battery pack 10 may be equal to a thickness of the holder 200.

Therefore, a height of the battery pack 10 may decrease by a thickness of a cover, etc. placed on the upper portion of the holder 200 to cover a conventional protection circuit module 300. Thus, when the battery pack 10 has a size that is the same as that of a conventional battery pack, a size of the bare cell 100 may relatively increase. As a result, a capacity of the battery pack 10 may increase without a change in size of the battery pack 10.

The protection member 400 may be, for example, a tape and may have a thickness T1 ranging from about 0.1 mm to about 0.2 mm. However, the present inventive concept is not limited thereto. For example, when the upper surface S2 of the protection member 400 is disposed at the same height or at a lower height than the edges 212 of the holder 200, any suitable protection member 400 may be used.

Because the FCB 330 is connected to the lower surface of the protection circuit module 300, the protection circuit module 300 may include a step difference part 312 on a side portion thereof in order to allow the FCB 300 to be extracted to the outside. In more detail, the step difference part 312 is formed by inserting a portion of the protection circuit module 300 into the inside thereof, and the FCB 330 may be extracted to the outside through a gap between the step difference part 312 and the edges 212 of the holder 200. In this case, the protection member 400 attached to the protection circuit module 300 may have a shape corresponding to a shape of the step difference part 312.

In one or more embodiments, the insulating plate 500 may be disposed on a surface (e.g., a lower surface) of the battery pack 10 which is opposite to the first surface and may prevent the second surface of the bare cell 100 from being exposed to the outside. The insulating plate 500 is formed of an insulating material and may be attached to the second surface by a second adhesive layer 144, for example.

The insulating plate 500 may include a protrusion 510 protruding toward the outside (e.g., away from the bare cell 100). The protrusion 510 may be a gate portion used when resin for forming the insulating plate 500 is inserted into a mold. In embodiments wherein the insulating plate 500 includes the protrusion 510 having a relatively great thickness, the insulating plate 500 may have a relatively small thickness in comparison with the insulating plate 500, portions of which have a constant thickness with the exception of the protrusion 510.

For example, a thickness of a portion of the insulating plate 500 which corresponds to the protrusion 510 may range from about 0.35 mm to about 0.5 mm, and a thickness of remaining portions of the insulating plate 500, other than the portion corresponding to the protrusion 510, may range from about 0.15 mm to about 0.3 mm. The above-described thickness is about 0.2 mm to about 0.3 mm as small as a thickness of the insulating plate 500 when the protrusion 510 is not formed, which means that the length of the battery pack 10 may be decreased according to (e.g., decreased by) the decreased thickness of the insulating plate 500. Therefore, when the battery pack 10 has the same size as a conventional battery pack, a size of the bare cell 100 may relatively increase. As a result, capacity of the battery pack 10 may increase.

Also, in an electronic device on which the battery pack 10 is mounted, a groove coupled to the protrusion 510 may be formed, and thus, when the battery pack 10 is mounted on the electronic device, the protrusion 510 may help easily set (or indicate) a location where the battery pack 10 is to be mounted, because the protrusion 510 is coupled to the groove.

Although FIG. 5 illustrates that only one protrusion 510 is formed on a central portion of the insulating plate 500, more protrusions 510 may be formed. For example, in one or more embodiments, at least two protrusions 510 may be formed.

The label L may insulate the can 110 by covering side surfaces of the bare cell 100. Also, the label L may cover a portion of side portions of the holder 200 and side portions of the insulating plate 500 together with the bare cell 100 so that the holder 200 and the insulating plate 500 may be firmly coupled to each other.

The battery pack 10 according to one or more exemplary embodiments of the inventive concept may be classified as an insertion type battery pack, and as described above, capacity of the bare cell 100 included in the battery pack 10 may be increased without changing a size of the battery pack 10.

According to one or more exemplary embodiments of the inventive concept, capacity of the battery pack may be increased without changing a size of the battery pack.

It should be understood that the exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope of the present invention as defined by the following claims, and their equivalents.

What is claimed is:

1. A battery pack comprising:
   a bare cell comprising an electrode terminal on a first surface thereof;
   a holder at the first surface and comprising a fixing groove at an upper surface thereof;
   a protection circuit module at the fixing groove and electrically connected to the bare cell; and
   a protection member attached to the protection circuit module,
   wherein the protection member is attached to an upper surface of the protection circuit module, the upper surface being at a lower height than upper edges of the fixing groove, and
   wherein an upper surface of the protection member is at a height that is the same as or lower than a height of edges of the holder.

2. The battery pack of claim 1, wherein the edges of the holder surround the protection circuit module and the protection member in a plane.

3. The battery pack of claim 1, wherein the protection member comprises a tape having a thickness from about 0.1 mm to about 0.2 mm.

4. The battery pack of claim 1, wherein the protection circuit module comprises a connector configured to be connected to an external device and a flexible circuit board (FCB) configured to be electrically connected to the connector.

5. The battery pack of claim 4, wherein the protection circuit module comprises a step difference part, and wherein the FCB is configured to be extracted to the outside through the step difference part.

6. The battery pack of claim 1, further comprising an insulating plate on a second surface of the bare cell, the second surface of the bare cell being opposite to the first surface of the bare cell, and
wherein the insulating plate comprises a protrusion protruding toward the outside.

7. The battery pack of claim 6, wherein a thickness of the insulating plate ranges from about 0.15 mm to about 0.3 mm.

8. The battery pack of claim 6, wherein the holder is attached to the first surface of the bare cell by a first adhesive layer,
wherein the insulating plate is attached to the second surface of the bare cell by a second adhesive layer, and
wherein the first adhesive layer has an opening that exposes the electrode terminal.

9. The battery pack of claim 1, further comprising a temperature protection device between the electrode terminal and the protection circuit module.

10. The battery pack of claim 1, wherein the bare cell comprises:
a can having an opening in a side thereof;
an electrode assembly housed in the can; and
a cap plate sealing the side of the can, the electrode terminal being at the cap plate,
wherein the electrode terminal and the cap plate have different polarities, and
wherein the protection circuit module is electrically connected to the electrode terminal and the cap plate.

* * * * *